United States Patent [19]
Tokunaga et al.

[11] 4,315,206
[45] Feb. 9, 1982

[54] CURRENT SUPPLY CIRCUIT FOR TELEPHONE EXCHANGE

[75] Inventors: Michio Tokunaga, Zushi; Ryoichi Okada, Iruma; Hideo Mizutani, Warabi; Koichi Hasegawa, Tokyo; Takaaki Osaki, Yokohama, all of Japan

[73] Assignees: Nippon Telegraph and Telephone Public Corporation; Oki Electric Industry Co., Ltd.; Nippon Electric Co., Ltd.; Fujitsu Ltd.; Hitachi, Ltd., all of Tokyo, Japan

[21] Appl. No.: 78,469

[22] Filed: Sep. 24, 1979

[30] Foreign Application Priority Data

Sep. 22, 1978 [JP] Japan ................. 53-115766
May 23, 1979 [JP] Japan ................. 54-62640

[51] Int. Cl.³ .............................................. G05F 1/44
[52] U.S. Cl. .................................................. 323/265
[58] Field of Search ............... 323/6, 23, 25, 57, 234, 323/265, 268, 273, 280

[56] References Cited

U.S. PATENT DOCUMENTS 3,094,654  6/1963  Roelli ................. 323/23 X
3,504,272  3/1970  Kenny ................ 323/25 X
3,509,448  4/1970  Bland ................. 323/25 X
4,189,670  2/1980  Tanahashi ............ 323/25 X

*Primary Examiner*—William M. Shoop
*Attorney, Agent, or Firm*—Craig and Antonelli

[57] ABSTRACT

A current supply circuit for a telephone exchange is disclosed in which a current-supplying current amplifier series-connected between a power supply and a load amplifys an output current of an input current supply circuit, and a driving current amplifier for driving the current-supplying current amplifier is controlled by an output of an output voltage detector parallel-connected with the load in a negative-feedback fashion to set the differential mode output impedance of the current supply circuit at a large or small value in accordance with frequency and to set the common mode output impedance at a small value; and in which a part of the output voltage detector for connecting the load to the driving current amplifier includes a diode for preventing a direct current from flowing in a opposite direction to that of a direct current from the power supply in order to suppress, independently of the state of the load, a current which flows from the load side into the driving current amplifier, whereby an increase in current is restricted and an on-off control can be conducted in a short time without impairing an essential function of the current supply circuit.

33 Claims, 10 Drawing Figures

FIG. 10

CURRENT SUPPLY CIRCUIT FOR TELEPHONE EXCHANGE

The present invention relates to an electronic current supply circuit which is incorporated in a telephone exchange and supplies a speech current to a telephone set.

Prior to comparison between the present invention and a prior art, the accompanying drawings will be briefly explained below.

Figure 1:
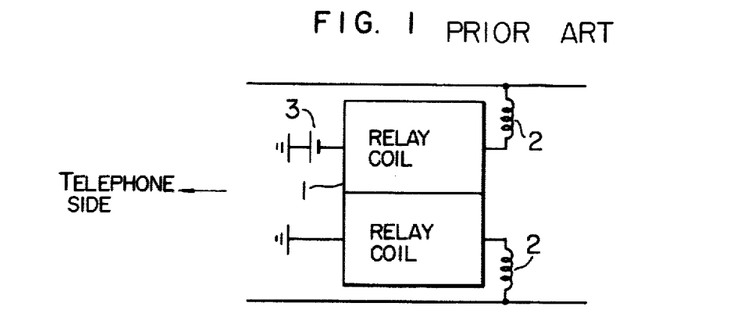
FIG. 1 is a schematic view of a conventional current supply circuit.

A conventional circuit for supplying a speech current, as shown in FIG. 1, is made up of a relay coil 1, a transformer 2 and a power supply 3. In such a circuit, the d.c. resistance viewed from the telephone side is determined by the d.c. resistance of the relay coil 1, and the transformer 2 has a high impedance for a voice signal (a differential mode signal) sent out of a telephone set in order to make small the transmission loss of the voice signal due to insertion of the circuit. While, common mode noise (a signal component flowing from both signal lines to ground) is attenuated to a great extent by the transformer 2 which is so designed as to have a small a.c. impedance to ground.

The fact that the conventional circuit for supplying a speech current is large in size and causes the packing volume of the electronic exchange to be also of large size has been called in question, with the recent popularity of the electronic exchange.

There have been proposed several electronic current supply circuits in Japanese patent application Laid-open No. 60510/77 and U.S. Pat. No. 3,649,769, for example. However, such current supply circuits do not perform in a satisfactory manner for the common mode signals. Further, in a case where a PNPN semiconductor switch is employed as a cross point switch for forming a network, speech current has to be stopped when the cross point switch is made to open. The conventional circuit has no on-off function for speech current.

An object of the present invention is to provide an electronic current supply circuit which is small in size when compared with the conventional one, and has the same function as the conventional circuit for voice (or differential mode) and common mode signals, and in which the d.c. resistance of the circuit can be changed from a high to a low value in accordance with the object, and an on-off control of direct current can be conducted.

According to the present invention, a current-supplying current amplifier is series-connected between a power supply and a load to amplify an electric current supplied from an input current supply circuit, and a negative feedback circuit is made up of the current-supplying current amplifier, a driving current amplifier for driving the current-supplying current amplifier, and an output voltage detector connected in parallel with the load in order to make large the differential output impedance of the current-supply circuit and to make small the common mode output impedance. Further, the input current supply circuit has a switchable circuit construction to permit switching of a current flowing between the power supply and the load.

Another object of the present invention is to provide a current supply circuit which can restrict an increase in current and can conduct an on-off control of current without impairing an essential function of the current supply circuit. In order to attain this object, according to the present invention, the output voltage detector connected in parallel with the load includes a diode in order to suppress a current which flows from the load side into the driving current amplifier, independently of the state of the load.

The present invention will be explained hereinafter in detail by reference to the accompanying drawings.

Figure 2:
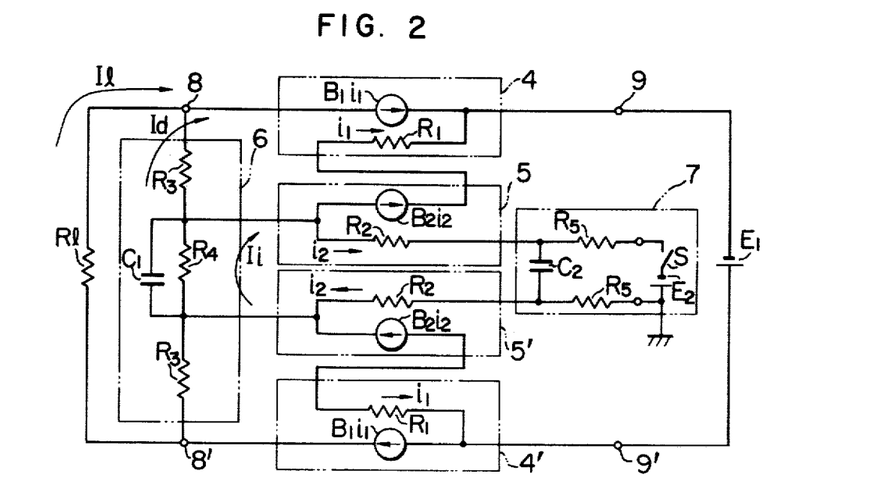
FIG. 2 is a view for showing the operational principle of a current supply circuit according to the present invention.

Referring to FIG. 2 which is a circuit diagram for showing the operational principle of a current supply circuit according to the present invention, block 4 designates a current-supplying current amplifier for supplying a current from a power supply $E_1$ to a load $R1$ (a line and a telephone set), block 5 a driving current amplifier amplifying a current supplied from an input current supply circuit 7 for driving the current-supplying current amplifier 4, and block 6 an output voltage detector for detecting a change in voltage appearing across the load $R1$.

When a switch S of the input current supply circuit 7 is closed, a current $i_2$ ($=E_2/\{2(R_2+R_5)+R_4\}$) which passes through a path ($E_2 \rightarrow R_5 \rightarrow R_2 \rightarrow R_4 \rightarrow R_2 \rightarrow R_5$), flows into the input side of the driving current amplifier 5 and is amplified by $\beta_2$ (a current amplification factor of the amplifier 5) times by the amplifier 5 to form an input current of the current-supplying current amplifier 4, which is further amplified by $\beta_1$ (a current amplification factor of the amplifier 4) times by the amplifier 4 to deliver an output current. The output current is divided at branching points 8 and 8' into two parts, one of which passes through the load $R1$ and the other flows through the output voltage detector 6. When a relation $R1 < 2R_3 + R_4$ is satisfied, the current $I1$ passing through the load $R1$ is greater than the current $Id$ passing through the detector 6. Incidentally, a current passing through the main power supply E, is equal to $I1 + Id$ ($=\beta_1 i_1 = \beta_1 \beta_2 i_2$), and has no direct connection with the power supply $E_1$ since the current $i_2$ depends upon only the power supply $E_2$. A voltage drop equal to $R_4(i_2+Id)$ is developed across a resistor $R_4$ of the output voltage detector 6. Since the current $Id$ flows in the same direction as the current $i_2$ flowing into the input side of the driving current amplifier 5, the input current $I_i$ of the current amplifier 5 is smaller than the current $i_2$ and is given by the following equation:

$$I_i = (E_2 - R_4 Id)/\{R_4 + 2(R_2 + R_5)\}$$

With an increase in resistance of the load $R1$, the current $Id$ is increased and the input current $I_i$ is decreased. A decrease in input current $I_i$ is amplified by $\beta_1\beta_2$ times by the amplifiers 4 and 5, to decrease the current $I1+Id$ passing through the main power supply $E_1$. That is, a loop $R_3 \to \beta_2 i_2 \to R_1 \to \beta_1 i_1$ forms a negative feedback loop. Therefore, the d.c. resistance of the current supply circuit viewed from the load side can be set at a given value by changing the feedback loop gain or feedback ratio. The feedback ratio becomes large as the resistance of the resistor $R_4$ is made greater. Further, as the current amplification factors $\beta_1$ and $\beta_2$ are made greater, the feedback ratio becomes large and the d.c. resistance of the current supply circuit is decreased. When the resistance of the resistor $R_4$ is made equal to zero, the feedback ratio is equal to zero, and the d.c. output resistance of the circuit becomes equal to a resistance $2R_3$, independently of the amplification factors $\beta_1$ and $\beta_2$. In this case, if the resistor $R_3$ has a high resistance, the current supply circuit becomes nearly equal to a constant-current circuit.

When the capacitor $C_1$ is selected so as to assume a low impedance for voice signals (differential mode signals), a voice signal sent to the current supply circuit passes through the bypass capacitor $C_1$. Therefore, the feedback action does not take place in the current supply circuit. That is, the current supply circuit is put in the same state as the case that the resistance of the resistor $R_4$ is made equal to zero, and threfore has a d.c. output resistance equal to $2R_3$. While, a noise signal which is induced at both ends of the load $R1$ in a common mode, flows simultaneously from the output terminals 8 and 8' to ground through a path $R_3 \to R_2 \to R_5$, and is amplified by $\beta_1\beta_2$ times by the amplifiers 4 and 5. The generation of such an amplified current gives rise to the absorption of current at terminals 8 and 8', which decreases the current flowing through the resistor $R_3$. In other words, a loop $R_3 \to \beta_2 i_2 \to R_1 \to \beta_1 i_1$ forms a negative feedback loop for the common mode signal. Accordingly, the current supply circuit can assume a low d.c. resistance for the common mode signal.

A detailed analysis of the above current supply circuit has shown that the current $I1$ flowing through the load $R1$ and the d.c. output resistance $Rod$ of the circuit for the differential mode signal can be given by the following equations:

$$I1 = \frac{2E_2}{R_5} \cdot \frac{1 + \beta_2 + \beta_1\beta_2\left(1 + \frac{2R_3}{R_4}\right)}{2\left(1 + \frac{R_3}{R_4}\right)\left(1 + \frac{R_2}{R_5}\right) + \frac{R_4}{R_5}\beta_1\beta_2\left(1 + \frac{2(1+\beta_2)}{\beta_1\beta_2} \cdot \frac{R1}{R_4}\right)} \quad (1)$$

$$Rod = \frac{2R_3\left\{\left(1 + \frac{2R_3}{R_4}\right)\frac{R_2 + R_5}{R_3} + 1 + \beta_2\right\}}{\frac{2R_3}{R_4} \cdot \frac{R_2 + R_5}{R_3} + 1 + \beta_2(1 + \beta_1)} \quad (2)$$

As is evident from equations (1) and (2), the current $I1$ is the function of only the power supply $E_2$, and independent of the main power supply $E_1$. This means that the output current sent to a telephone set is never affected by a voltage variation of the main power supply $E_1$ and by current noise appearing on the main power supply $E_1$. Further, the output current can be readily put in the on or off state through the on-off operation of the switch S of the input current supply circuit 7. Incidentally, the output resistance $Z_{oc}$ of the current supply circuit for the common mode signal is given by the following equation:

$$Z_{oc} = \frac{1 + \beta_2 + \frac{R_2}{R_3} + \frac{R_5}{R_1}}{1 + \beta_2(1 + \beta_1)} \cdot R_3 \quad (3)$$

As is seen in equation (3), the output resistance $Z_{oc}$ is not affected by the presence or absence of the capacitor $C_1$.

In the foregoing, a balanced-type circuit has been explained. However, an unbalanced-type circuit is readily obtained by constructing a circuit which includes only the upper half of the circuit shown in FIG. 2.

Although the operational principle of the present invention has been explained employing a current amplifier, a current supply circuit according to the present invention may include a voltage-current transform amplifier or a combination of a resistor and an operational amplifier, in place of the whole or a part of the current amplifier.

Several embodiments of the present invention will be explained hereinafter in detail.

EMBODIMENT I

Figure 3:
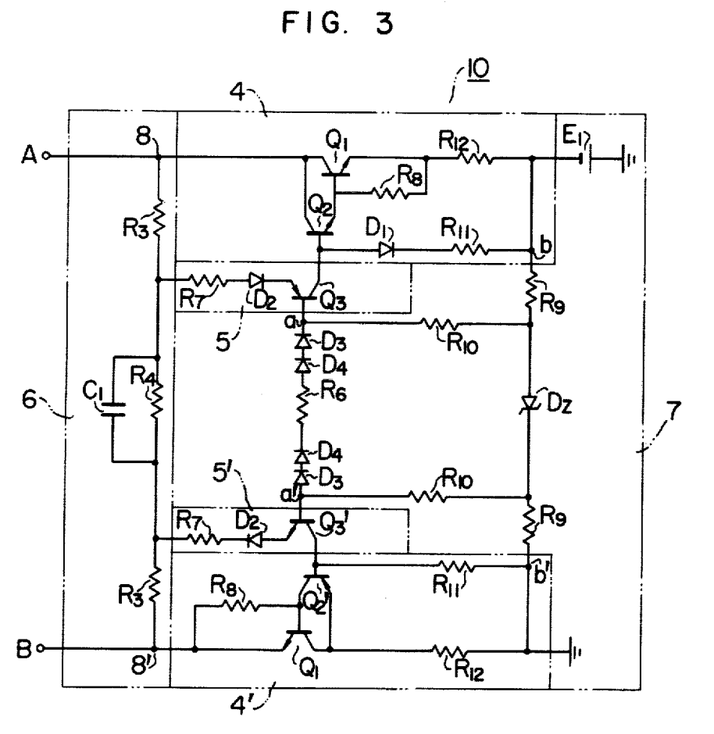
FIG. 3 is a circuit diagram showing an embodiment of a current supply circuit according to the present invention.

Referring to FIG. 3 which shows an embodiment of a current supply circuit according to the present invention, a current supply circuit 10 is connected at terminals A and B to a load (not shown). The same reference numerals as in FIG. 2 indicate like parts or elements. NPN transistors $Q_1$ and $Q_2$ makes up a Darlington circuit. Resistors $R_{11}$ and $R_{12}$ and a forward-connected diode $D_1$ which are connected in series between the emitter of $Q_1$ and the base of $Q_2$, forms one of current-supplying current amplifiers 4, together with the above-mentioned Darlington circuit. The emitter of $Q_1$ is connected through the resistor $R_{12}$ to one terminal of a main power supply $E_1$, the other terminal of which is grounded. The other current amplifier 4' is made up of a complementary Darlington circuit including an NPN transistor $Q_1$ and a PNP transistor $Q'_2$, and resistors $R_{11}$ and $R_{12}$ which are connected in series between the collector of $Q_1$ and the has of $Q'_2$. The current amplifiers 4 and 4' employ the transistors $Q_1$ of the same type as their output transistors. The collector of $Q_1$ in the current amplifier 4' is connected through a resistor $R_{12}$ to ground. The current amplifiers 4 and 4' can satisfly the balancing condition by appropriately selecting respective resistances of the resistors $R_{11}$ and $R_{12}$. A driving current amplifier 5 or 5' is made up of a PNP transistor $Q_3$ or NPN transistor $Q'_3$, a forward-connected diode $D_2$ and a resistor $R_7$. The diode $D_2$ and the resistor $R_7$ are connected in series with the emitter of $Q_3$ or $Q'_3$. The resistor $R_7$ is employed to make great the input resistance of the current amplifier 5 or 5', and the diode $D_2$ serves to assure a breakdown voltage between the base and emitter of $Q_3$ or $Q'_3$ when negative or positive high voltage appears at terminal A or B, respectively. Resistors $R_3$, $R_4$ and $R_3$ connected in series with each other, and a capacitor $C_1$ connected in parallel with $R_4$ make up an output voltage detector 6 which detects a change in voltage developed across a load Rl (not shown). A Zener diode $D_Z$, resistors $R_9$ and $R_9$ connected with both ends of $D_Z$, resistors $R_{10}$, $R_6$ and $R_{10}$ connected in series with $D_Z$, and diodes $D_3$, $D_4$, $D_3$ and $D_4$ connected between resistors $R_6$ and $R_{10}$ make up an input current supply circuit 7. In this circuit, the resistors $R_{10}$ and $R_{10}$ are connected with junction points between the Zener diode $D_Z$ and the resistors $R_9$ and $R_9$, each pair of diodes $D_3$ and $D_4$ are connected to the base of $Q_3$ or $Q'_3$ through a branching point a or a', and the resistors $R_9$ and $R_9$ are connected through branching points b and b' to the main power supply $E_1$ and ground, respectively. The Zener diode $D_Z$ is employed in place of the power supply $E_2$ shown in FIG. 2, but it is not always required to employ such a diode. Further, the diodes $D_3$, $D_4$, $D_4$ and $D_3$ serve to correct a voltage $V_{BE}$ between the base and emitter of each of the transistors $Q_3$ and $Q'_3$, and therefore the use of these diodes is not always required.

Further, the current supply circuit 10 is little affected by a change in current amplification factor of each transistor by appropriately selecting the resistors $R_{11}$ and $R_{12}$ for the transistors $Q_1$, $Q_2$ and $Q'_2$, and by selecting the resistors $R_6$, $R_4$ and $R_7$ for the transistors $Q_3$ and $Q'_3$.

Each of the current amplifiers 4, 4', 5 and 5' can be formed of various combinations of transistor and resistor other than the circuit arrangement shown in FIG. 3. Further, in the output voltage detector 6, the resistor $R_4$ may be replaced by a combination of a resistor R and a capacitor C, or by a combination of the resistor R and an appropriate power supply. Similarly, the input current supply circuit 7 can be constructed in various circuit arrangements. For example, when the Zener diode $D_Z$ is removed or replaced by a resistor R, the input current supply circuit 7 is changed to a resistance type voltage dividing circuit. Further, when the resistor $R_9$ is replaced by a switching circuit, the input current supply circuit is converted into a switchable circuit.

EMBODIMENT II

Figure 4:
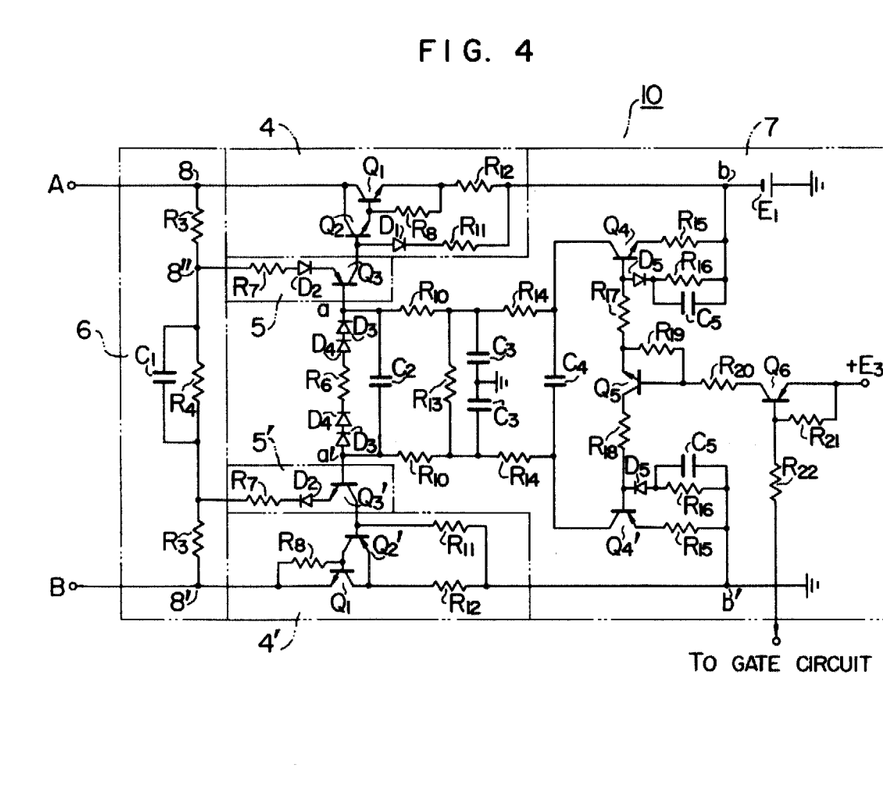
FIG. 4 is a circuit diagram showing another embodiment of a current supply circuit according to the present invention, in which the input current supply circuit 7 shown in FIG. 3 is replaced by another one.

FIG. 4 shows another embodiment of a current supply circuit according to the present invention, in which a switchable current supply circuit is employed in place of the input current supply circuit 7 shown in FIG. 3. In FIG. 4, the same reference numerals as in FIGS. 2 and 3 indicate like parts and elements. Referring to FIG. 4, transistors $Q_4$, $Q'_4$, $Q_5$ and $Q_6$, diodes $D_3$ to $D_5$, resistors $R_6$, $R_{10}$ and $R_{13}$ to $R_{22}$, and capacitors $C_2$ to $C_5$ substantially make up an input current supply circuit 7, and the transistors $Q_4$, $Q'_4$, $Q_5$ and $Q_6$ make up a switch for switching the supply of current. In more detail, the collector of $Q_4$ is connected to $R_{10}$ through $R_{14}$, and similarly the collector of $Q'_4$ is connected to $R_{10}$ through $R_{14}$. The base of $Q_4$ is connected through $R_{17}$ to the emitter of $Q_5$, and the collector of $Q_5$ is connected through $R_{18}$ to the base of $Q'_4$. The base of $Q_5$ is connected through $R_{20}$ to the collector of $Q_6$. The emitter and base of $Q_5$ are connected to each other through $R_{19}$. The emitter and base of $Q_4$ (or $Q'_4$) are connected to each other through a series circuit of $D_5$, $R_{15}$ and $R_{16}$. The emitter of $Q_6$ is connected to a power supply $E_3$, the emitter and base of $Q_6$ are connected to each other through $R_{21}$, and the base of $Q_6$ is connected through $R_{22}$ to a gate circuit (not shown). A series circuit of $D_3$, $D_4$, $R_6$, $D_4$ and $D_3$ is connected with $C_2$ in parallel. Both $R_{13}$ and a series circuit of $C_3$ and $C_3$ are connected to junction points between $R_{10}$ and $R_{14}$ to form a parallel circuit. A junction point between $C_3$ and $C_3$ is grounded. The capacitor $C_4$ is connected between the collector of $Q_4$ and that of $Q'_4$, and the capacitor $C_5$ is connected with $R_{16}$ in parallel.

When the gate circuit is turned on, a current flows from the power supply $E_3$ to the collector of the transistor $Q_6$. This current is amplified by the transistor $Q_5$ to put the transistors $Q_4$ and $Q'_4$ into saturation. Thus, the supply voltage of the main power supply $E_1$ connected between terminals b and b' is divided by the resistors $R_{15}$, $R_{14}$, $R_{13}$, $R_{14}$ and $R_{15}$, and a voltage developed across the resistor $R_{13}$ is further divided by the resistors $R_{10}$, $R_6$ and $R_{10}$ to produce a voltage between branching points a and a', which drives the transistors $Q_3$ and $Q'_3$. The capacitors $C_2$ to $C_5$ serve to smooth the waveforms of the rising and falling currents of the driving current when the gate circuit is turned on and off. In more detail, the capacitors $C_4$ and $C_5$ make smooth the rising waveform of the driving (or supply) current, and the capacitors $C_2$ and $C_3$ improve the falling waveform.

Figure 5:
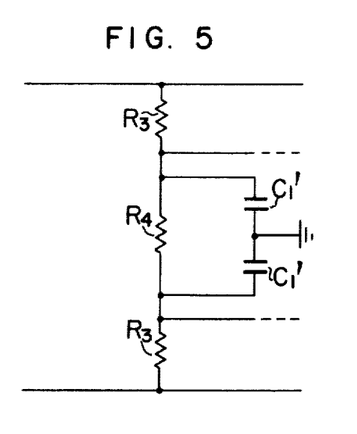
FIG. 5 is a circuit diagram showing an example of the output voltage detector employed in the present invention.

FIG. 5 shows another embodiment of an output voltage detector circuit. Both ends of the resistors $R_4$ is connected to a series circuit of two capacitors $C'_1$ and $C'_1$, to form a parallel circuit. Further, the junction point of the capacitors is grounded. As is apparent from FIG. 5, a bypass circuit is provided for a differential mode signal within the voice band and for a high-frequency common mode signal. Accordingly, these signals are not subjected to the negative feedback action, and the d.c. output resistance of the current supply circuit 10 for these signals is substantially determined by the resistor $R_3$. While, the capacitor $C'_1$ has a high impedance for a low frequency signal. In this case, as has been explained in connection with FIG. 2, a negative feedback loop $R_3 \rightarrow R_2 \rightarrow R_5 \rightarrow$ ground is formed, which makes low the d.c. output resistance of the current supply circuit. Therefore, this circuit can be equivalent to the conventional circuit including a relay coil and a transformer.

As described above, according to the present invention, a current supply circuit which has the same function and performance as the conventional current supply circuit including a relay coil and a transformer, can be made up of semiconductor parts. Accordingly, the circuit can be readily made small in size. Further, the circuit can be possessed of a function of switching the supply current by employing a simple input-output circuit. Therefore, the current supply circuit according to the present invention can be used in various fields of application.

EMBODIMENT III

Figure 6:
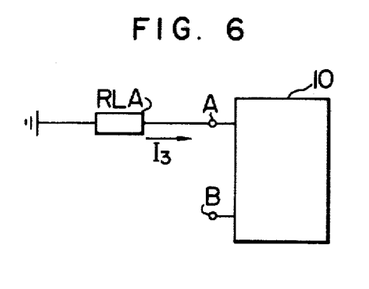
FIGS. 6 to 9 are connection diagrams for showing various states of load applied to a current supply circuit.
Figure 7:
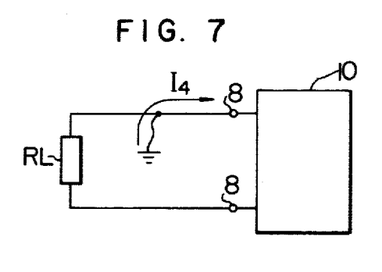
Figure 8:
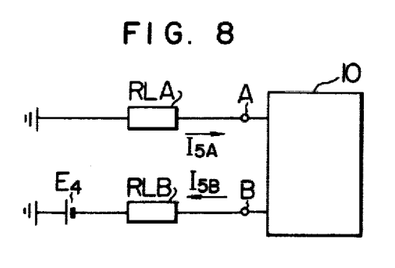
Figure 9:
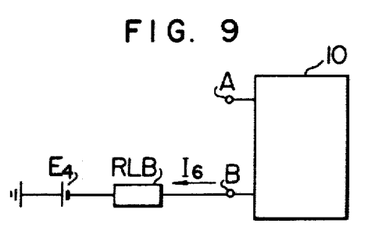

In a case that the current supply circuit shown in FIG. 4 is employed as a current supply circuit on the trunk line side of an incoming trunk, there arise such problems as mentioned later. First explanation will be made on this case, Terminals A and B of the current supply circuit are connected through a junction line to a trunk circuit (an outgoing trunk circuit) of a distant office. The load connected to the terminals A and B is varied depending upon the operational state of trunk. For example, the load applied to the current supply circuit on the junction line side of the incoming trunk assumes such states as shown in FIGS. 6 to 9, depending upon the operational state of the trunk. FIG. 6 shows the state of the load at a time when the incoming trunk receives from the distant trunk (outgoing trunk) a start signal resulting from the ground connection of A-line. In FIG. 6, reference numeral 10 indicates a current supply circuit of an incoming trunk, and reference characters RLA and $I_3$ indicate a load and a current flowing into a terminal A, respectively. FIG. 7 shows the state of load during a call, FIG. 8 shows the state of load at a time when a start dial signal is sent out, and FIG. 9 shows the state of load at a time when a distant trunk (outgoing trunk) is blocked.

Now, explanation will be made on the operation of the current supply circuit 10 in the states shown in FIGS. 6 to 9, by reference to FIGS. 2 and 4. When the circuit 10, as shown in FIG. 6, receives a start signal, the terminal A is grounded and the terminal B is made open. Accordingly, the current $I_3$ flows along a route ground→RLA→A→8→$Q_1$→$R_{12}$→$E_1$. That is, the current $I_3$ flowing from the load RLA into the current supply circuit 10 becomes $\beta_1\beta_2$ times as large as a driving current supplied from the input current supply circuit 7. However, in a case when the resistance of the load RLA is made less than a predetermined value (for example, in a case that the load resistance is made less than 200 or 300Ω for a 400-Ω d.c. resistance of the current supply circuit 10 viewed from the terminals A and B), the potential appearing at both ends of the resistor $R_3$ of the output voltage detector 6 is higher at the branching point 8 than at the point 8". Accordingly, the current $I_3$ flowing from the terminal A into the current supply circuit 10 is divided at the branching point 8 into two parts, one of which flows along a route 8→$R_3$→8"→$R_7$→$D_2$→$Q_3$→$R_{10}$→$R_{14}$→$Q_4$→$R_{14}$→$E_1$, namely, flows through the driving current amplifier 5. This branch-current is added to the driving current supplied from the input current supply circuit 7. The resultant current is amplified by $\beta_1\beta_2$ times by the current amplifiers 4 and 5. The amplified current flows from the terminal A into the current amplifier 4. Accordingly, the current $I_3$ becomes extremely large. Referring to FIG. 7, the load RLA has an appropriate resistance during a call if the line is kept in a normal state, and therefore the current flowing into the current supply circuit 10 does not become too large. However, when an earthing trouble, as shown in FIG. 7, takes place on the A-line side, the potential at the branching point 8 (shown in FIG. 4) becomes high, and therefore a current $I_4$ (shown in FIG. 7) becomes extremely large.

Referring to FIG. 8, in the case when a start dial signal is sent to the distant trunk (outgoing trunk), the current supply circuit 10 is grounded on the A-terminal side, and is connected on the B-terminal side to a battery $E_4$. At this time, a current flows from the load side into the current supply circuit 10 along the route ground→RLA→A→8→$R_3$→$R_7$→$D_2$→$Q_3$→$R_{10}$→$R_{13}$→$R_{10}$→$Q'_3$→$D_2$→$R_7$→$R_3$→8'→B→RLB→$E_4$. This current flows through the driving current amplifiers 5 and 5' as a driving current. Accordingly, even when the input current supply circuit 7 is put in the off state, the above-mentioned driving current is amplified by $\beta_1\beta_2$ times to form currents $I_{5A}$ and $I_{5B}$ flowing through the current-supplying current amplifiers 4 and 4'. Thus, there arises a problem that the current supply circuit 10 cannot be brought into the off state.

Referring to FIG. 9, in the case when the distant trunk (outgoing trunk) is blocked, the current supply circuit 10 is made open at the terminal A and is connected on the B-terminal side to a battery $E_4$. In this case, when the input current supply circuit 7 is put in the off state for the purpose of bringing the current supply circuit 10 into the off state, a changing current of the capacitor $C_3$ flows along a route ground→$C_3$→$R_{10}$→$Q'_3$→$D_2$→$R_7$→$R_3$→8'→B→RLB→$E_4$. In this case, the load resistance RLB viewed from the capacitor $C_3$ is made $\beta_2$ times larger by the driving current amplifier 5, the time constant of charging becomes long, and therefore it takes a lot of time for the charging current to decrease to zero. The charging current is amplified by $\beta_2$ times by the driving current amplifier 5 and further amplified by $\beta_1$ times by the current-supplying current amplifier 4 to form a load current $I_6$ which flows into the load RLB through the terminal B. Thus, an extremely long time interval (tens of seconds to several minutes) is required between the time when the current supply circuit was put in the off state and the time when the load current $I_6$ becomes zero. Such a long time constant produces some problems with respect to the operation of trunk.

As has been explained above, the current supply circuit shown in FIG. 4 offers no problem in such an ordinary current-supplying state as the duration of a call, but cannot perform a satisfactory operation in such cases that the one side operation is performed, that the earthing trouble takes place, and that the on-off control is conducted. In these cases, there arise various problems such as mentioned above.

An object of the present embodiment (third embodiment) is to provide a current supply circuit which can solve the above-mentioned problems, which can prevent the generation of large current without imparing the essential function of the current supply circuit, and which can perform an on-off control in a short time.

In order to attain the above object, in the present embodiment, a diode is inserted into an output voltage detector which is connected with a load in parallel, in order to prevent a current from flowing from the load side to a driving current amplifier, independently of the state of load.

Figure 10:
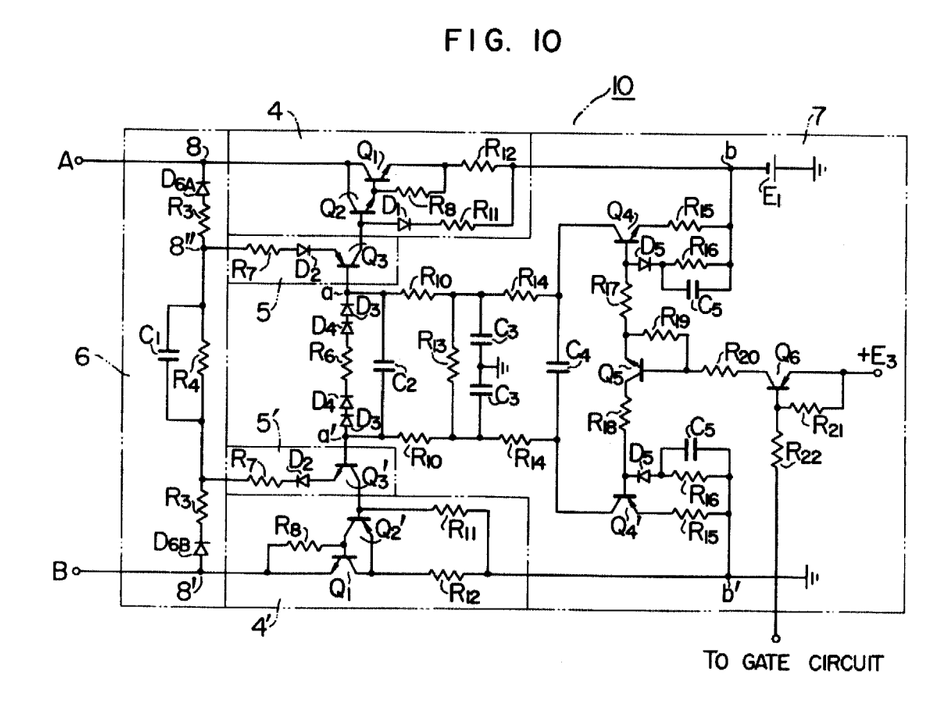
FIG. 10 is a circuit diagram showing a further embodiment of a current supply circuit according to the present invention.

FIG. 10 shows this embodiment. The current supply circuit 10 shown in FIG. 10 includes the same input current supply circuit 7 as the circuit 10 shown in FIG. 4, namely, the input current supply circuit 7 which can switch the supply of current on and off and can make smooth the waveform of on-off current. In FIG. 10, the same reference numerals as in FIG. 4 indicate like parts. As is seen in FIG. 10, the output voltage detector 6 according to this embodiment includes diodes D6A and D6B, each of which is series-connected with a resistor $R_3$.

In the third embodiment having such a circuit configuration, two feedback loops made up of the current-supplying current amplifiers 4 and 4', the driving current amplifiers 5 and 5', and the output voltage detector 6 can be made equal to zero in d.c. feedback loop gain or feedback ratio. That is, a load current flowing from the load side into the terminals A and B flows through only the current-supplying current amplifiers 4 and 4', and that portion of the load current which flows through the driving current amplifiers 5 and 5' as a driving current, is blocked by the diodes D6A and D6B. As a result, the load current flowing from the load side into the current supply circuit is determined by a driving current supplied from the input current supply circuit 7, namely, becomes $\beta_1\beta_2$ times as large as the driving current.

Now, let us consider, for example, such a case where a current supply circuit is employed as a circuit on the junction line side of an incoming trunk. When a start signal is received (FIG. 6), or when an earthing trouble takes place (FIG. 7), according to the current supply circuit shown in FIG. 3, a current flows from ground on the load side into the driving current amplifier 5 through the terminal A, and therefore an extremely large current flows through a load. While, according to the current supply circuit shown in FIG. 10 which includes the diode D6A, the diode D6A prevents a part of the load current from flowing through the driving current amplifier 5 as a driving current. Accordingly, the load current is $\beta_1\beta_2$ times as large as a driving current supplied from the input current supply circuit 7, and does not become too large.

Further, in the state shown in FIG. 8, namely, in the state of load at a time when a proceed-to-send signal is sent out after a start signal has been received, according to the circuit configuration shown in FIG. 3, a current flows from the load side into the driving current amplifiers 5 and 5' irrespective of the on or off state of input current supply circuit 7. While, according to the circuit configuration shown in FIG. 10, the diodes D6A and D6B block the above current. As a result, when the input current supply circuit is put in the off state, the driving current becomes zero, and therefore the load current flowing through a load can be made equal to zero. That is, the current supply circuit is immediately brought into the off state.

In the state shown in FIG. 9, namely, in the state of load at a time when a distant trunk is blocked, when an input current supply circuit is put in the off state in order to remove the blocking of the distant trunk, according to the circuit configuration shown in FIG. 3, the charging current of the capacitor C3 flows, and a load current continues to flow till the charging current is decreased to zero. While, according to the circuit configuration shown in FIG. 10, the diode D6B connected on the B-terminal side blocks the charging current. As a result, a load current flowing through a load is decreased to zero in a very short time (tens of microseconds to several milliseconds) after the input current supply circuit 7 has been put in the off state.

In the foregoing, explanation has been made on the operation of a current supply circuit which is placed on the junction line side of an incoming trunk. However, the current supply circuit is generally employed at subscriber's circuits and various trunk circuits. In such cases, the operation of the current supply circuit is not affected by the presence of diodes D6A and D6B at an operating time, for example, during a call. Referring to FIG. 2, when an ordinary current-supply operation is effected, the current Id flowing through the output voltage detector 6 passes through the diodes D6A and D6B in a forward direction, and the current I1 flowing through the road R1 passes through only the current-supplying current amplifiers 4 and 4'. That is, the presence of diodes D6A and D6B exerts no influence on the operation of the current supply circuit. Further, the function and operation of the current supply circuit for the voice signal, common mode noise, or the like are not affected by the diodes D6A and D6B, because a direct current flows usually through the diodes D6A and D6B in a forward direction, and the alternating current is superposed on the direct current.

In the foregoing explanation, two diodes D6A and D6B have been employed. However, only the the diode D6A may be used for one side operation of the current supply circuit, or as a measure to meet the earthing trouble, and only the diode D6B may be used as a measure to meet the on-off control.

Although the balanced-type current supply circuits have been explained, an unbalanced-type current supply circuit is readily obtained by forming only an upper half of the circuit shown in FIG. 10.

As explained above, a current supply circuit according to the third embodiment which includes additional diodes, can prevent the generation of large current at a time when one side operation is effected, or when an earthing trouble takes place, without imparing the essential function and operation of the circuit, and moreover can conduct an on-off control of load current in a short time.

What we claim is:

1. A current supply circuit comprising:
   a pair of current-supplying current amplifiers, a pair of output terminals of each of said current-supplying current amplifiers being series-connected between a load and one of power supply terminals;
   an output voltage detector parallel-connected with said load and including an impedance element;
   a pair of driving current amplifiers, a pair of output terminals of each of said driving current amplifiers being connected between an input terminal of each of said current-supplying current amplifiers and one of output terminals of said output voltage detector, said driving current amplifier, said current-supplying current amplifier and said output voltage detector making up a negative feedback loop; and
   an input current supply circuit connected between input terminals of said driving current amplifiers and including a power supply.

2. A current supply circuit according to claim 1, wherein said input current supply circuit includes means for switching the supply of current on and off.

3. A current supply circuit according to claim 2, wherein said input current supply circuit includes means for smoothing the waveform of an on-off current.

4. A current supply circuit according to claim 1, wherein said output voltage detector includes a parallel circuit of a resistor and a capacitor.

5. A current supply circuit according to claim 1, wherein said output voltage detector includes a parallel circuit of a resistor and two series-connected capacitors, and a junction point of said capacitors is grounded.

6. A current supply circuit comprising:
   an input current supply circuit;
   a current-supplying current amplifier series-connected between a power supply and a load for amplifying a current from said input current supply circuit;
   a driving current amplifier connected between said input current supply circuit and said current-supplying current amplifier for driving said current-supplying current amplifier; and
   an output voltage detector parallel-connected with said load; said output voltage detector, said current-supplying current amplifier and said driving current amplifier making up a negative feedback loop, wherein said current-supplying current amplifier includes two transistors forming a Darlington circuit and a resistor connected between a base of one of said transistors and an emitter of the other transistor for compensating a change in current amplification factor.

7. A current supply circuit according to claim 1, wherein one of said current-supplying current amplifiers includes two transistors forming a Darlington circuit and a resistor connected between a base of one of said transistors and an emitter of the other transistor for compensating a change in current amplification factor, and the other current-supplying current amplifier includes two transistors forming a complementary Darlington circuit and a resistor connected between a base of one of said transistors and an emitter of the other transistor for compensating a change in current amplification factor.

8. A current supply circuit according to claim 1, wherein said driving current amplifier includes a transistor, a forward-connected diode and a resistor, and said diode and said resistor are connected in series with the emitter of said transistor.

9. A current supply circuit according to claim 1, wherein said output voltage detector includes in a portion thereof for connecting said load to said driving current amplifier a diode for preventing a direct current from flowing in a reverse direction to a direction of a different direct current from said power supply.

10. A current supply circuit according to claim 2, wherein said output voltage detector includes in a portion thereof for connecting said load to said driving current amplifier a diode for preventing a direct current from flowing in a reverse direction to a direction of a different direct current from said power supply.

11. A current supply circuit according to claim 3, wherein said output voltage detector includes in a portion thereof for connecting said load to said driving current amplifier a diode for preventing a direct current from flowing in a reverse direction to a direction of a different current from said power supply.

12. A current supply circuit according to claim 4, wherein said output voltage detector includes in a portion thereof for connecting said load to said driving current amplifier a diode for preventing a direct current from flowing in a reverse direction to a direction of a different direct current from said power supply.

13. A current supply circuit according to claim 5, wherein said output voltage detector includes in a portion thereof for connecting said load to said driving current amplifier a diode for preventing a direct current from flowing in a reverse direction to a direction of a different direct current from said power supply.

14. A current supply circuit according to claim 6 or 7, wherein said output voltage detector includes in a portion thereof for connecting said load to said driving current amplifier a diode for preventing a direct current from flowing in a reverse direction to a direction of a different direct current from said power supply.

15. A current supply circuit according to claim 8, wherein said output voltage detector includes in a portion thereof for connecting said load to said driving current amplifier a diode for preventing a direct current from flowing in a reverse direction to a direction of a different direct current from said power supply.

16. A current supply circuit comprising:
an input current supply circuit;
a current-supplying current amplifier series-connected between a power supply and a load for amplifying a current from said input current supply circuit;
a driving current amplifier connected between said input current supply circuit and said current-supplying current amplifier for driving said current-supplying current amplifier; and
an output voltage detector parallel-connected with said load; said output voltage detector, said current-supplying current amplifier and said driving current amplifier making up a negative feedback loop, wherein said input current supply circuit includes means for switching the supply of current on and off and means for smoothing the waveform of an on-off current, wherein said current-supplying current amplifier includes two transistors forming a Darlington circuit and a resistor connected between a base of one of said transistors and an emitter of the other transistor for compensating a change in current amplification factor, wherein said driving current amplifier includes a transistor, a forward-connected diode and a resistor, and said diode and said resistor are connected in series with the emitter of said transistor, wherein said output voltage detector includes a parallel circuit of a resistor and two series-connected capacitors, and a junction point of said capacitors is grounded, and wherein said output voltage detector further includes in a portion thereof for connecting said load to said driving current amplifier a diode for preventing a direct current from flowing in a reverse direction to a direction of a different direct current from said power supply.

17. A current supply circuit according to claim 1, wherein said input current supply circuit includes means for switching the supply of current on and off and means for smoothing the waveform of an on-off current, wherein one of said current-supplying current amplifiers includes two transistors forming a Darlington circuit and a resistor connected between a base of one of said transistors and an emitter of the other transistor for compensating a change in current amplification factor, and the other current-supplying current amplifier includes two transistors forming a complementary Darlington circuit and a resistor connected between a base of one of said transistors and an emitter of the other transistor for compensating a change in current amplification factor, wherein each of said driving current amplifiers includes a transistor, a forward-connected diode and a resistor, and said diode and said resistor are connected in series with the emitter of said transistor, wherein said output voltage detector includes a parallel circuit of a resistor and two series-connected capacitors, and a junction point of said capacitors is grounded, and wherein said output voltage detector further includes in a portion thereof for connecting said load to said driving current amplifiers at least one diode for preventing a direct current from flowing in a reverse direction to a direction of a different direct current from said power supply.

18. A current supply circuit comprising:
an input current supply circuit;
a current-supplying current amplifier series-connected between a power supply and a load for amplifying a current from said input current supply circuit;

a driving current amplifier connected between said input current supply circuit and said current-supplying current amplifier for driving said current-supplying current amplifier; and an output voltage detector parallel-connected with said load; said output voltage detector, said current-supplying current amplifier and said driving current amplifier making up a negative feedback loop;

said input current supply circuit including means for switching the supply of current on and off.

19. A current supply circuit according to claim 18, wherein said input current supply circuit includes means for smoothing the waveform of an on-off current.

20. A current supply circuit comprising:
an input current supply circuit;
a current-supplying current amplifier series-connected between a power supply and a load for amplifying a current from said input current supply circuit;
a driving current amplifier connected between said input current supply circuit and said current-supplying current amplifier for driving said current-supplying current amplifier; and
an output voltage detector parallel-connected with said load; said output voltage detector; said current-supplying current amplifier and said driving current amplifier making up a negative feedback loop, said output voltage detector including a parallel circuit of a resistor and two series-connected capacitors, the junction point of said capacitors being grounded.

21. A current supply circuit comprising:
an input current supply circuit;
a current-supplying current amplifier series-connected between a power supply and a load for amplifying a current from said input current supply circuit;
a driving current amplifier connected between said input current supply circuit and said current-supplying current amplifier for driving said current-supplying current amplifier, including a transistor, a forward-connected diode and a resistor, the diode and resistor being connected in series with the emitter of said transistor; and
an output voltage detector parallel-connected with said load; said output voltage detector, said current-supplying current amplifier and said driving current amplifier making up a negative feedback loop.

22. A current supply circuit comprising:
an input current supply circuit;
a current-supplying current amplifier series-connected between a power supply and a load for amplifying a current from said input current supply circuit;
a driving current amplifier connected between said input current supply circuit and said current-supplying current amplifier for driving said current-supplying current amplifier; and
an output voltage detector parallel-connected with said load; said output voltage detector, said current-supplying current amplifier and said driving current amplifier making up a negative feedback loop, including in a portion thereof for connecting said load to said driving current amplifier a diode for preventing a direct current from flowing in a reverse direction to a direction of a different direct current from said power supply.

23. A current supply circuit according to claim 18, wherein said output voltage detector includes in a portion thereof for connecting said load to said driving current amplifier a diode for preventing a direct current from flowing in a reverse direction to a direction of a different direct current from said power supply.

24. A current supply circuit according to claim 19, wherein said output voltage detector includes in a portion thereof for connecting said load to said driving current amplifier a diode for preventing a direct current from flowing in a reverse direction to a direction of a different current from said power supply.

25. A current supply circuit according to claim 20, wherein said output voltage detector includes in a portion thereof for connecting said load to said driving current amplifier a diode for preventing a direct current from flowing in a reverse direction to a direction of a different direct current from said power supply.

26. A current supply circuit according to claim 21, wherein said output voltage detector includes in a portion thereof for connecting said load to said driving current amplifier a diode for preventing a direct current from flowing in a reverse direction to a direction of a different direct current from said power supply.

27. A current supply circuit for supplying a D.C. current through a line to a load comprising:
current amplifying means for amplifying a driving current applied to an input terminal thereof to control the D.C. current through the line from a potential source to the load, a common terminal of which is connected with the potential source and an output terminal of which is connected with the load through the line;
driving current amplifying means having an output terminal which is connected with the input terminal of the current amplifying means and which amplifies a driving current applied to an input terminal thereof to control the driving current to be applied to the input terminal of the current amplifying means;
driving current supplying means for supplying the driving current to the input terminal of the driving current amplifying means; and
output voltage detecting means which is connected with the output terminal of the current amplifying means and which detects a voltage corresponding to the voltage applied to the load through the line and applies the detected voltage to the common terminal of the current amplifying means to form a negative feedback loop together with the current amplifying means and the driving current amplifying means.

28. A current supply circuit for supplying a D.C. current to a load connected in series between a first line and a second line comprising:
first current amplifying means having a common terminal which is connected with a first potential source and an output terminal which is connected with the load through the first line;
second current amplifying means a common terminal of which is connected with a second potential source and an output terminal of which is connected with the load through a second line;
said first and second current amplifying means amplifying respective first and second driving currents applied to respective input terminals thereof to control D.C. currents applied to the load through the first and second lines;

first driving current amplifying means an output terminal of which is connected with the input terminal of the first current amplifying means and which amplifies the first driving current applied to an input terminal thereof to control the first driving current to be applied to the input terminal of the first current amplifying means;

second driving current amplifying means an output terminal of which is connected with the input terminal of the second current amplifying means and which amplifies the second driving current applied to an input terminal thereof to control the second driving current to be applied to the input terminal of the second current amplifying means;

driving current supplying means for supplying the driving currents to the respective input terminals of said first and second driving current amplifying means;

output voltage detecting means which is connected between the respective output terminals of the first and second current amplifying means and which detects a voltage corresponding to the voltage applied to the load through the first and second lines and applies the detected voltage to respective common terminals of the first and second driving current amplifying means to form a first negative feedback loop together with the first current amplifying means and the first driving current amplifying means and a second negative feedback loop together with the second current amplifying means and the second driving current amplifying means.

29. A current supply circuit as claimed in claim 27, wherein said driving current supplying means is provided with switching means for on-off controlling the driving circuit supplied to the input terminal of said driving current amplifying means.

30. A current supply circuit as claimed in claim 28, wherein said driving current supplying means is provided with switching means for on-off controlling the driving current supplied to the respective input terminals of said first and second driving current amplifying means.

31. A current supply circuit according to claims 29 or 30, wherein said input current supply circuit includes means for smoothing the waveform of an on-off current.

32. A current supply circuit according to claims 27 or 28, wherein said output voltage detector includes a parallel circuit of a resistor and a capacitor.

33. A current supply circuit according to claims 27 or 28, wherein said output voltage detector includes a parallel circuit of a resistor and two series-connected capacitors, and a junction point of said capacitors is grounded.

* * * * *